United States Patent [19]

Smith

[11] 3,823,553
[45] July 16, 1974

[54] GAS TURBINE WITH REMOVABLE SELF CONTAINED POWER TURBINE MODULE

[75] Inventor: James Smith, Topsfield, Mass.

[73] Assignee: General Electric Company, Lynn, Mass.

[22] Filed: Dec. 26, 1972

[21] Appl. No.: 318,280

[52] U.S. Cl........... 60/39.16 R, 60/39.08, 60/39.31, 415/190, 415/219 R
[51] Int. Cl. ............................................. F02c 3/10
[58] Field of Search............ 60/39.16, 39.31, 39.32, 60/39.28 P, 236, 268; 415/201, 217, 104, 219, 190, 125

[56] References Cited
UNITED STATES PATENTS

| | | | |
|---|---|---|---|
| 2,444,363 | 6/1948 | Newcomb | 60/39.28 P |
| 2,770,946 | 11/1956 | Savin | 60/39.16 |
| 2,851,246 | 9/1958 | Nichols | 415/190 |
| 2,862,356 | 12/1958 | Kent et al. | 60/39.16 R |
| 2,916,874 | 12/1959 | Worobel | 60/39.16 |
| 2,933,893 | 4/1960 | Blyth et al. | 60/39.16 |
| 2,971,334 | 2/1961 | Carlson | 60/39.16 |
| 3,088,278 | 5/1963 | Franz | 60/39.16 |

Primary Examiner—Carlton R. Croyle
Assistant Examiner—Warren Olsen

[57] ABSTRACT

An aircraft gas turbine engine includes a power turbine module having a self-contained turbine, frame, bearings, sump and drive shaft all housed within a casing which is releasably connected to the engine such that the entire module including turbine, frame, bearings, sump and drive shaft may be readily removed and replaced by simply disconnecting the module casing from the engine. The entire operation may be accomplished without having to remove the engine from its associated aircraft.

8 Claims, 5 Drawing Figures

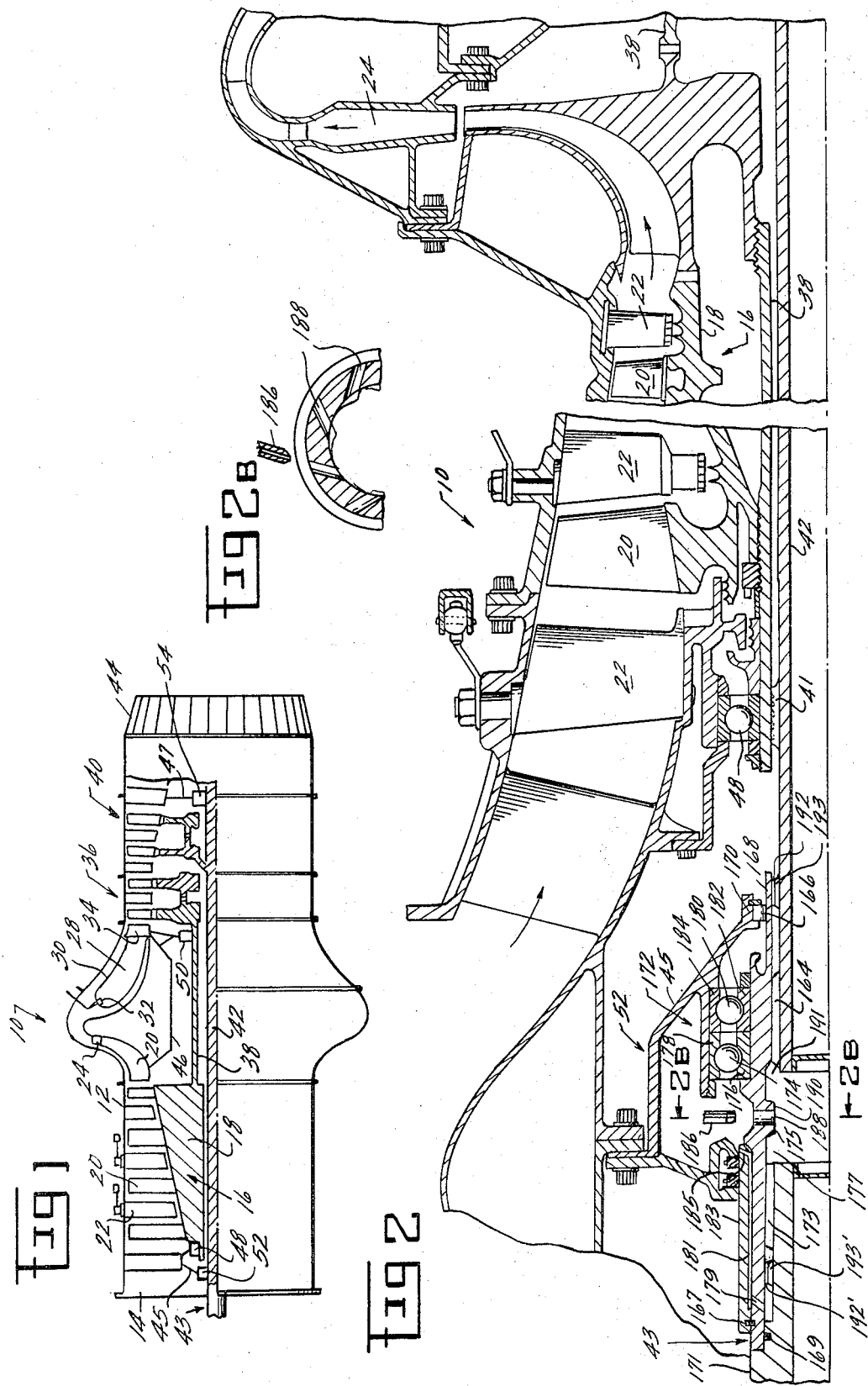

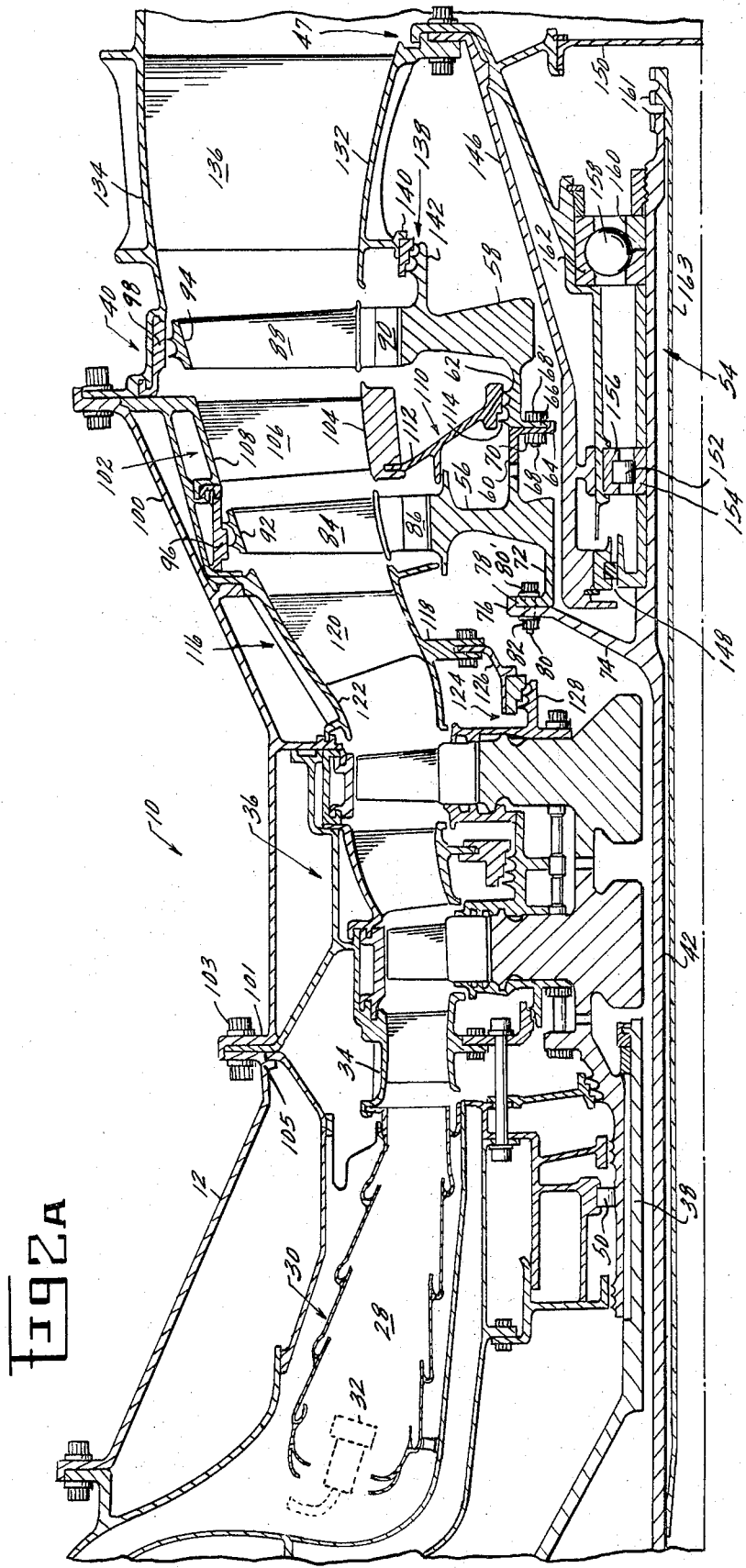

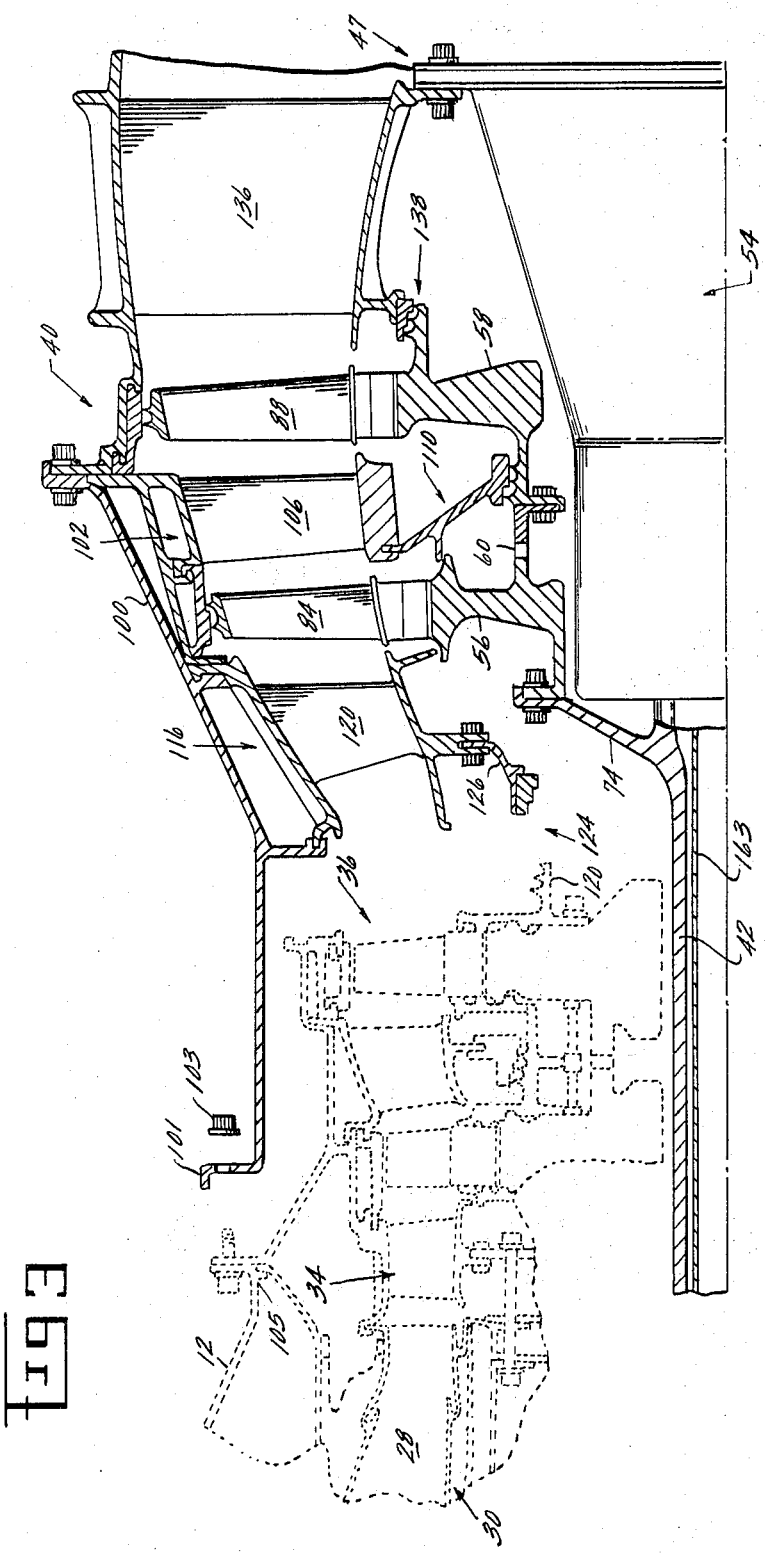

GAS TURBINE WITH REMOVABLE SELF CONTAINED POWER TURBINE MODULE

BACKGROUND OF THE INVENTION

This invention relates to a gas turbine engine having a power turbine module and, more particularly, to an aircraft gas turbine engine having a power turbine module wherein the module includes a turbine, frame, bearings, sump and drive shaft, all housed therein such that the module may be removed and replaced, utilizing only the tools found in a standard Army A07 toolbox without having to remove the engine from its aircraft.

The invention herein described was made in the course of or under a contract or subcontract thereunder (or grant) with the Department of the Army.

It has been a recent objective of the United States Army to develop a low cost reliable and easily maintained aircraft to replace today's UH-1 "Huey" helicopter. The aircraft will have a VTOL capability and be designed primarily to carry a combat equipped infantry squad of eleven men and a three man crew; however, it may also be utilized to provide logistic support and serve as an aerial command post and ambulance. Of primary importance to the Army is the maintainability of the aircraft engines which, due to the VTOL capability of the aircraft, will be utilized in areas where conventional air fields are non-existent, such as in combat zones and other isolated areas. Under these and related conditions, the aircraft engines, which will be of the gas turbine turboshaft type, will be subject to the ingestion of substantial quantities of small foreign objects, such as sand and dust particles, and thereby incur a substantially increased risk of foreign object damage. Therefore, the aircraft engines must be readily repairable in combat zones and other isolated areas away from airfields and service shops where manpower may be limited and where the only tools available may be those generally found in a standard Army A07 toolbox. Also under the above described field conditions, the equipment required to remove the engine from the aircraft will likely not be available and thus the engine must be repairable while remaining attached to the aircraft.

Therefore, it is a primary object of this invention to provide a gas turbine engine having a power turbine module which may be removed and replaced in the field by a two-man team without the need for special tools.

It is also an object of this invention to provide an aircraft gas turbine engine with a power turbine module which may be removed and replaced in the field using only the tools found in the standard Army A07 toolbox and without having to remove the engine from its aircraft.

SUMMARY OF THE INVENTION

A gas turbine engine includes an outer casing open at one end to provide an airflow inlet. A front frame is disposed within the casing, together with a power takeoff shaft journaled for rotation with respect to the front frame. A compressor receives and pressurizes an inlet airflow for delivery to a combustion chamber within which the pressurized airflow is mixed with an inlet flow of fuel and ignited to produce a high energy gas stream. A gas generator turbine receives the high energy gas stream from the combustor via a nozzle diaphragm and drives the compressor through an interconnecting shaft. A power turbine module housing a rear frame receives the high energy gas stream exiting from the gas generator turbine and drives a drive shaft journaled for rotation therewith. The drive shaft is journaled for rotation with respect to the rear frame by bearings within a sump contained entirely within the power turbine module wherein the drive shaft extends forwardly through the engine into splined engagement with the power takeoff shaft. The module also includes a casing releasably connected to the engine casing such that the entire module including turbine, rear frame, drive shaft, bearings, and sump may be removed in an axially aft direction by disconnecting the module casing from the engine casing.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a side view, partly in cross-section, of the gas turbine engine of this invention.

FIG. 2 is an enlarged cross-sectional view of a portion of the gas turbine engine of FIG. 1.

FIG. 2A is an enlarged cross-sectional view of the remaining portion of the gas turbine engine of FIG. 2.

FIG. 2B is a partial cross-sectional view along the line 2B—2B of FIG. 2.

FIG. 3 is a cross-sectional view of the low pressure turbine of FIG. 2A disassembled from the gas turbine engine.

DESCRIPTION OF THE PREFERRED EMBODIMENT

Referring to FIG. 1, there is shown a gas turbine engine 10 of the turboshaft type having an outer casing 12 open at one end to provide an inlet 14. Ambient air enters the inlet 14 and is compressed by a compressor 16 which may be of the axial-centrifugal flow type. Compressor 16 includes a rotor 18 from which extend a number of axially spaced apart rows of rotor blades 20 interdigited between rows of axially spaced apart stator vanes 22 which may be of the variable type. Pressurized air is discharged from the compressor 16 through a plurality of circumferentially spaced apart diffuser guide vanes 24 through which the compressed air is diffused prior to entering a combustion chamber 28. Combustion chamber 28 is defined by a combustion liner 30 and receives an inlet flow of fuel through a plurality of circumferentially spaced apart fuel nozzles 32. The high pressure air and fuel mixture is ignited to produce a high energy gas stream which exits from the combustion chamber 28 through a nozzle diaphragm 34. High energy gas from the nozzle diaphragm 34 drives a gas generator turbine 36 which drivably connects to the compressor rotor 18 through an interconnecting shaft 38. High energy gas exiting from the gas generator turbine 36 drives a power turbine module 40 which, for example, may be connected to drive the rotor blades of a helicopter, not shown, through a drive shaft 42 which engages a power takeoff shaft 43. It will also be appreciated that the power takeoff shaft 43 could alternatively be connected to drive a fan rotor as in a turbofan engine or a propeller as in a turboprop engine. The remaining high energy gas stream from the power turbine module 40 may be discharged through an exhaust nozzle 44 which may be of the variable type. Gas turbine engine 10 includes a forward frame 45 within which the rotor 18 is journaled for rotation by a forward bearing housed within a sump 48 and within which the power takeoff shaft 43 is also journaled for rotation by bearings housed within a sump 52. There is also provided an intermediate frame 46 within which the shaft 38 is journaled by a bearing housed within a sump 50. An aft frame 47 is contained entirely within the power turbine module 40 and the drive shaft 42 is journaled by bearings housed within a sump 54 for rotation with respect to the power turbine module.

Referring now to FIGS. 2 and 2A, the power turbine module 40 is shown in greater detail as including a forward rotor disc 56 spaced axially apart from an aft rotor disc 58. The forward rotor disc 56 includes an integral cylindrical extension 60, the aft end of which terminates in an integral circumferential flange 64 extending radially inward in abutting relation to a second integral circumferential flange 66 which extends radially inward from a second cylindrical extension 62 formed integral to the aft rotor disc 58. The circumferential flanges 64, 66 are maintained in abutting relation by a plurality of circumferentially spaced apart elongated bolts 68 extending through the flanges wherein each bolt 68 has a bolt head 68' integrally formed to one end thereof with the opposing end threadably engaged by a locknut 70. The forward rotor disc 56 includes a forwardly extending cylindrical extension 72 formed integral therewith, the end of which terminates in a radially outwardly extending circumferential flange 78 which engages a second radially outwardly extending circumferential flange 76 formed integral to a conical extension 74 from the shaft 42. Flanges 76, 78 are connected in abutting relation by a plurality of circumferentially spaced apart elongated bolts 80 extending therethrough wherein each bolt 80 includes a bolt head 80' integrally formed to one end thereof with the opposing end threadably engaged by locknut 82.

The forward rotor disc 56 includes a plurality of circumferentially spaced apart airfoil type blades 84 disposed about the periphery thereof. Each airfoil type blade 84 includes an inner root portion 86 which connects to the rotor disc 56 in a manner well known to the turbine art. Each airfoil type blade 84 also includes an outer platform 92 with radially outwardly extending teeth which engage a circumferential shroud 96, which may be of the honeycomb type, to prevent flow leakage of high energy gas stream around the turbine blades 84. In like manner, the aft rotor disc 58 also includes a plurality of circumferentially spaced apart airfoil type blades 88 disposed about the periphery thereof. Each airfoil type blade 88 includes an inner root portion 90 which may be engaged to the rotor disc 58 in a manner well known to the turbine art. Each airfoil type blade 88 further includes an outer platform 94, the revolving teeth of which engage an outer circumferential shroud 98 which also may be of the honeycomb type. Although the power turbine module has been described in reference to a two stage turbine, it is to be understood that more or less stages may be included without departing from the scope of invention.

Intermediate the forward rotor disc 56 and the aft rotor disc 58 there is provided a nozzle diaphragm 102 which includes an inner circumferential shroud 104 from which extend radially outward a plurality of circumferentially spaced apart guide vanes, the outer radial ends of which engage an outer circumferential shroud member 108. Gas flow leakage around the nozzle diaphragm 102 is prevented by a flow seal 110 of the labyrinth type which includes a stator member 112 carried by the inner circumferential shroud 104 and engaged by revolving teeth 114 which project radially outward from the cylindrical extension 62.

An inlet nozzle diaphragm 116 includes an inner circumferential shroud 118 from which extend radially outward a plurality of circumferentially spaced apart inlet guide vanes 120, the outer radial ends of which engage an outer circumferential shroud member 122. An airflow seal 124 of the labyrinth type is provided between the gas generator turbine 36 and the power turbine module 40 and includes a stator member 126 carried by the inner circumferential shroud 118 and engaged by the teeth of a rotational member 128 which extends from the gas generator turbine 36. The rear frame 47 includes an inner circumferential wall 132 from which extend radially outward a plurality of circumferentially spaced apart spokes 136, the outer radial ends of which engage an outer circumferential wall 134 so as to define an annular flowpath between the inner and outer walls. A flow seal 138 of the labyrinth type is provided between the aft rotor disc 58 and the rear frame 47, and includes a stator member 140 engaged by the teeth of a rotational member 142 formed integral to the rotor disc 58. It should be further appreciated that inlet nozzle diaphragm 116, shroud 96, nozzle diaphragm 102, shroud 98, and rear frame 47 are maintained in fixed axially spaced serial flow relation by interconnection to a power turbine module outer casing 100. The power turbine module casing 100 forms a portion of the overall engine casing 12 and is attached thereto by a plurality of circumferentially spaced apart locking bolts 103 which engage and maintain in abutting relation circumferential flanges 101 and 105.

The rear oil sump 54 is defined generally by a forward conical extension member 146 and a rear radial cap member 150. The forward conical extension member sealingly engages the shaft 42 by a carbon seal 148 as is well known in the gas turbine art. The drive shaft 42 is journaled for rotation with respect to the engine frame 47 by a plurality of circumferentially spaced apart rollers 152 disposed intermediate an inner circumferential bearing ring 154 which is attached for rotation with the drive shaft 42 and an outer circumferential bearing ring 156 which is maintained in fixed relation relative to the engine frame 47. There is also provided a thrust bearing having a plurality of circumferentially spaced apart balls 158 disposed intermediate a split inner bearing ring 160 and an outer bearing ring 162. It will be appreciated that the rollers 152 could be eliminated entirely with the drive shaft 42 journaled only by the thrust bearing.

Whereas drive shaft 42 may be hollow, it is particularly well suited to accommodate at the aft end thereof, a torque sensing indicator 161 which is of a conventional type well known to the gas turbine art and includes an indicator arm 163 extending into the shaft 42 in fixed connection therewith.

The forward end of shaft 42 engages the power takeoff shaft 43 through a working spline 164, the outward extending teeth of which engage inwardly extending teeth from the power takeoff shaft 43. Power takeoff shaft 43 is journaled for rotation with respect to the engine frame 45 by a plurality of circumferentially spaced apart rollers 166 disposed intermediate an integral cylindrical extension 168 from shaft 43 and an outer bearing ring 170 which is maintained in fixed connection relative to the forward frame 45. As is readily apparent, an inner bearing ring, not shown, could be sleeved over the extension 168 for rotation therewith. There is also provided a preloaded dual thrust bearing 172 having a first row of circumferentially spaced apart balls 174 disposed intermediate an inner bearing ring 176 and an outer bearing ring 178 and a second row of circumferentially spaced apart balls 180 spaced axially aft of the first row 174 and intermediate an inner bearing ring 182 and an outer bearing ring 184. Because a thrust load will not normally be applied to the power takeoff shaft 43, it becomes necessary to preload the thrust bearing 172 in order to prevent the ball bearings 174, 180 from skidding within their respective retaining rings. Again it will be appreciated that the rollers 166 may be eliminated entirely with the power takeoff shaft 43 journaled solely by the thrust bearing 172.

The working spline 164 is lubricated by a portion of a stream of oil furnished from an oil jet 186 from whence the stream of oil is directed inside the power takeoff shaft 43 through a plurality of circumferentially spaced apart and tangentially slanted inlet ports 188 as may be best seen in FIG. 2B. The inside ends of the inlet ports 188 may be bossed in order to better reduce the flow of oil back through the ports. A portion of the oil entering the interior of the power takeoff shaft 43 is splashed over an interior circumferential lip 190 and accumulates in an annular cavity 191 between lip 190 and the working spline 164 as a result of the centrifugal force of the revolving power takeoff shaft 43. As oil accumulates in cavity 191, it is gradually forced through the inter-engaging teeth of the working spline 164 thereby continuously lubricating the working spline 164. A downstream circumferential dam 192 which also acts as a vibration dampening means is formed integral to the shaft 42 and sealingly engages the inside surface of the integral cylindrical extension 168. There is further provided a plurality of circumferentially spaced apart holes 193 through the dam 192 wherein the holes 193 are suitably sized and positioned to regulate the flow and level of oil through the working spline 164. A downstream seal 41 is formed integral to the shaft 42 and defines the downstream limit of the sump 52.

A customer drive shaft 171, which may be connected to drive the rotors of an aircraft, now shown, and which forms an integral part of the aircraft, may engage the power takeoff shaft 43 through an interconnecting spline 173 wherein the spline includes outward extending teeth from the customer drive shaft 171 engaged by inward extending teeth from the power takeoff shaft 43. Spline 173 is also lubricated by a portion of the oil furnished from the oil jet 186 wherein a portion of the oil entering the interior of the power takeoff shaft 43 is splashed over a second interior circumferential lip 175. The oil then accumulates in a second annular cavity 177 between lip 175 and spline 173 as a result of the centrifugal force of the revolving shafts. As oil accumulates in cavity 177, it is gradually forced through the interengaging teeth of the spline 173, thereby continuously lubricating the spline. A second circumferential dam 192' is formed integral to the customer drive shaft 171 and sealingly engages the inside surface of the power takeoff shaft 43. There is also provided a second plurality of circumferentially spaced apart holes 193' through the dam 192' wherein the holes 193' are suitably sized and positioned to regulate the flow and level of oil through the working spline 164. The oil then exits through a plurality of circumferentially spaced apart passages 179 which extend through the power takeoff shaft 43 and communicate with an annular plenum 181. Plenum 181 is defined by the outer surface of the power takeoff shaft 43 and the spaced apart inner surface of a sleeve 183 telescoped over the shaft 43 wherein oil exits from the plenum 181 through a plurality of circumferentially spaced apart holes 185 at the aft end of sleeve 183. O rings 167, 169 may be disposed in sealing engagement between the customer drive shaft 171 and the power takeoff shaft 43 and between the power takeoff shaft 43 and sleeve 183 respectively. Thus it will be appreciated that a single oil jet 186 in cooperation with a single row of inlet ports 188 is arranged to simultaneously lubricate two axially spaced apart splines 164, 173.

In order to remove the power turbine module 40 as may become necessary in order to gain access to the combustion chamber 28, to repair or replace damaged combustor components, it is only necessary to loosen and remove the locking bolts 103, whereupon the power turbine module may be retracted in an axially aft direction as shown in FIG. 3. No special tooling is required to loosen or tighten bolts 103, and therefore the power turbine module 40 may be removed and replaced in its entirety using only those tools generally found in the standard Army AO7 toolbox. It will be further appreciated that the rear oil sump 54 is contained entirely within the power turbine module 40 which may be removed and replaced without opening the sump or breaking or disassembling a bearing or oil seal. Maintaining the integrity of the oil sump precludes the possibility of contaminants entering the oil and damaging rotating components.

It will also be appreciated that the customer drive shaft 171 may remain in splined engagement to the engine power takeoff shaft 43 during removal of the turbine module, thus making it unnecessary to remove the engine from the aircraft.

The outwardly extending teeth of the working spline 164 disengage in an axially aft direction with the shaft 42 without any disruption or disassembly of the rollers 166 or the preloaded dual thrust bearings 172. It will be further appreciated that the fluid seal 124 between the gas generator turbine 36 and the power turbine module 40 readily breaks apart with retraction of the power turbine module. Once the power turbine module 40 has been removed, it can be replaced in its entirety without exposing the sump and bearing to contamination, as would previously have been the case for an emergency repair performed during actual combat conditions. The damaged turbine module can then be returned to a service shop for further breakdown and repair of the individual module components.

Thus having described a preferred embodiment of the invention, though not exhaustive of all possible equivalents, what is desired to be secured by letters patent is claimed below.

What is claimed is:

1. A gas turbine engine comprises:

a casing open at one end to provide an inlet;
a front frame disposed within the casing;
a power takeoff shaft journalled for rotation by a first bearing means within the front frame;
a compressor which receives and pressurizes an inlet airflow;
a combustion chamber for receiving the pressurized airflow from the compressor, together with an inlet flow of fuel wherein the high pressure air and fuel mixture is ignited to produce a high energy gas stream;
a gas generator turbine which receives the high energy gas stream from the combustor and drives the compressor through an interconnecting hollow shaft;
and a power turbine module housing a rear frame wherein the module receives the high energy gas stream exiting from the gas generator turbine to drive a drive shaft journalled for rotation with respect to the rear frame by second bearing and sump means contained entirely within the power turbine module wherein the drive shaft extends forwardly through the engine into a first splined engagement with the power takeoff shaft, said first splined engagement being in coaxially spaced relation with said first bearing means, and the module further includes a casing releasably connected to the engine casing such that the entire module including turbine, rear frame, drive shaft, bearing and sump may be removed in an axially aft direction by disconnecting the module casing from the engine casing.

2. The gas turbine engine of claim 1 wherein the turbine module includes a casing having a generally radially extending circumferential flange which may be attached to a second generally radially extending circumferential flange from the engine casing by a plurality of circumferentially spaced apart bolts extending therethrough.

3. The gas turbine engine of claim 2 wherein the turbine module includes:
a forward and an aft rotor disc maintained in axially spaced relation in driving connection to the drive shaft, with each rotor disc having a plurality of circumferentially spaced apart blades disposed about the periphery thereof;
a forward and an aft shroud circumscribing the forward and aft rotor discs respectively;
a nozzle diaphragm disposed intermediate the forward and aft rotor discs;
an inlet nozzle diaphragm for receiving and directing the high energy gas stream from the high pressure turbine; and
an outlet through which the high energy gas stream exists from the turbine module wherein the inlet nozzle diaphragm, forward shroud, intermediate nozzle diaphragm, aft shroud, and outlet are all maintained in fixed axially spaced serial flow relation by interconnection to the power turbine module outer casing.

4. The gas turbine of claim 1 wherein the power takeoff shaft is hollow to accommodate axial insertion of the drive shaft and the splined connection includes outward extending teeth from the drive shaft engaged by inward extending teeth from the power takeoff shaft lubricated by a portion of a stream of oil furnished from an oil jet stationed outside the power takeoff shaft from whence the stream of oil is directed inside the power takeoff shaft 43 through a plurality of circumferentially spaced apart and tangentially slanted ports whereupon the oil subsequently splashes over an interior circumferential lip and accumulates in an annular cavity between the lip and spline prior to being forced through the inter-engaging teeth of the spline and wherein there is further included a downstream circumferential dam having at least one suitably placed and sized hole therethrough to control the level and regulate the flow of oil through the spline.

5. The gas turbine engine of claim 4 wherein the power takeoff shaft includes a second spline spaced axially forward of the first spline to accommodate connection to a customer drive shaft and wherein the second spline is also lubricated by a portion of the oil stream which is splashed over a second interior circumferential lip spaced axially forward of the first lip and which accumulates in an annular cavity between the lip and second spline prior to being forced through the teeth of the second spline and wherein there is further included a second downstream circumferential dam having at least one suitably placed and sized hole therethrough to control the level and regulate the flow of oil through the spline.

6. The gas turbine of claim 4 wherein the first bearing means includes a plurality of circumferentially spaced apart rollers disposed intermediate an integral cylindrical extension from the power takeoff shaft and an outer bearing ring maintained in fixed connection relative to the engine frame and also including a preloaded dual thrust bearing having a first row of circumferentially spaced apart balls disposed intermediate an inner bearing ring and an outer bearing ring and a second row of circumferentially spaced apart balls spaced axially aft of the first row and intermediate an inner bearing ring and an outer bearing ring.

7. The gas turbine of claim 1 wherein the drive shaft is hollow and there is included a torque sensor stationed within the bore of the drive shaft having torque indicating means located at the rear end of the drive shaft within the sump and with an indicator arm extending into the shaft in fixed connection therewith.

8. The gas turbine of claim 1 wherein the drive shaft includes:
a working spline at the forward end thereof;
a circumferential dam formed integral to the shaft axially aft of the working spline which may also act as a vibration dampening means;
a seal formed integral to the drive shaft downstream of the dam;
a flange formed integral to the shaft for connection to the turbine and,
an integral extension extending aft of the flange into engagement with the bearing.

* * * * *